(12) United States Patent
Jaiswal et al.

(10) Patent No.: US 11,196,864 B1
(45) Date of Patent: Dec. 7, 2021

(54) ANALYZING VOICE RESPONSE TO TELEPHONE CALL TO ASSIGN APPROPRIATE AGENT

(71) Applicant: International Business Machines Corporation, Armonk, NY (US)

(72) Inventors: Peeyush Jaiswal, Boca Raton, FL (US); Priyansh Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/074,855

(22) Filed: Oct. 20, 2020

(51) Int. Cl.
  *H04M 3/51* (2006.01)
  *H04M 3/523* (2006.01)

(52) U.S. Cl.
  CPC ....... H04M 3/5232 (2013.01); H04M 3/5158 (2013.01); *H04M 2203/654* (2013.01)

(58) Field of Classification Search
  CPC ...... H04M 3/51; H04M 3/5158; H04M 3/523; H04M 3/5232; H04M 2203/654
  USPC ........................................ 379/265.06–265.14
  See application file for complete search history.

(56) References Cited

U.S. PATENT DOCUMENTS

| | | | |
|---|---|---|---|
| 4,910,767 A | 3/1990 | Brugliera et al. | |
| 5,481,595 A | 1/1996 | Ohashi et al. | |
| 9,716,792 B2 | 7/2017 | McGann et al. | |
| 2014/0058721 A1 | 2/2014 | Becerra | |
| 2015/0358469 A1 | 12/2015 | Ramkumar et al. | |
| 2016/0119477 A1 | 4/2016 | Sharpe et al. | |
| 2018/0159977 A1* | 6/2018 | Danson | H04M 3/5232 |
| 2018/0183930 A1* | 6/2018 | Raanani | G06F 16/3344 |

\* cited by examiner

*Primary Examiner* — Harry S Hong
(74) *Attorney, Agent, or Firm* — Robert A. Voigt, Jr.; Winstead PC (57) ABSTRACT

A computer-implemented method, system and computer program product for enhancing auto dialer systems. A voice response from a communication device of a prospective customer to a telephone call made by the auto dialer is detected. The prospective customer's voice response is then analyzed to determine characteristics of the prospective customer. A profile of the prospective customer is then created containing such determined characteristics. Furthermore, the profiles of agents that are available to assist the prospective customer containing characteristics of such agents are analyzed. Additionally, the profile of the prospective customer is analyzed. After analyzing the profiles of the agents available to assist the prospective customer as well as the profile of the prospective customer, a free agent is identified that would best service the prospective customer based on such an analysis. The telephone call is then connected to the communication device of the identified agent to service the prospective customer.

20 Claims, 5 Drawing Sheets

FIG. 5 ously described an auto dialer as an electronic device or software that automatically dials telephone numbers. Once the call has been answered, the auto dialer either plays a recorded message or connects the call to a live person.

ANALYZING VOICE RESPONSE TO TELEPHONE CALL TO ASSIGN APPROPRIATE AGENT

TECHNICAL FIELD

The present disclosure relates generally to auto dialer systems, and more particularly to analyzing a voice response from a prospective customer to a telephone call made by an auto dialer to determine the appropriate agent to service the prospective customer.

BACKGROUND

An auto dialer is an electronic device or software that automatically dials telephone numbers. Once the call has been answered, the auto dialer either plays a recorded message or connects the call to a live person.

An important technology for auto dialers is the ability to distinguish between live human pick-ups from answering machines. Since there is no indication hardware signal when a call is answered by an answering machine or voice-mail system, auto dialer systems have to analyze incoming audio for a prediction.

After making such a prediction, if the prediction is that there has been a live human pick-up, the auto dialer connects the answered call to a live agent.

The live agent though may not be the best suited agent to service the prospective customer.

SUMMARY

In one embodiment of the present disclosure, a computer-implemented method for enhancing auto dialer systems comprises detecting a voice response from a communication device of a prospective customer to a telephone call. The method further comprises analyzing the voice response to determine characteristics of the prospective customer. The method additionally comprises creating a profile of the prospective customer to include the determined characteristics. Furthermore, the method comprises analyzing profiles of agents that are available to assist the prospective customer, where the profiles of agents comprise characteristics of the agents that are available to assist the prospective customer. Additionally, the method comprises analyzing the profile of the prospective customer. In addition, the method comprises identifying a free agent from the agents that are available to assist the prospective customer based on the analysis of the characteristics of the agents hat are available to assist the prospective customer and the analysis of the characteristics of the prospective customer. The method further comprises connecting the telephone call to a communication device of the identified free agent to service the prospective customer.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

As stated in the Background section, an auto dialer is an electronic device or software that automatically dials telephone numbers. Once the call has been answered, the auto dialer either plays a recorded message or connects the call to a live person.

An important technology for auto dialers is the ability to distinguish between live human pick-ups from answering machines. Since there is no indication hardware signal when a call is answered by an answering machine or voice-mail system, auto dialer systems have to analyze incoming audio for a prediction.

After making such a prediction, if the prediction is that there has been a live human pick-up, the auto dialer connects the answered call to a live agent.

The live agent though may not be the best suited agent to service the prospective customer.

Unfortunately, auto dialers do not include technology to connect the call to the live agent that would be best to service the prospective customer.

The embodiments of the present disclosure provide a means for improving the technology or technical field of auto dialer systems by analyzing a voice response from a prospective customer to a telephone call made by an auto dialer to determine the appropriate agent to service the prospective customer.

In some embodiments of the present disclosure, the present disclosure comprises a computer-implemented method, system and computer program product for enhancing auto dialer systems. In one embodiment of the present disclosure, a voice response from a communication device of a prospective customer to a telephone call made by the auto dialer is detected. The prospective customer's voice response is then analyzed to determine characteristics of the prospective customer, such as age, gender, language, mood, emotions, etc. A profile of the prospective customer is then created containing such determined characteristics. Furthermore, the profiles of agents that are available to assist the prospective customer are analyzed. Such profiles of agents include characteristics, such as friendliness, patience, empathy, listening capacity, language, communication skills, age, etc. Additionally, the profile of the prospective customer is analyzed. After analyzing the profiles of the agents available to assist the prospective customer as well as the profile of the prospective customer, a free agent is identified that would best service the prospective customer based on such an analysis. For example, the free agent with the most appropriate skills to service this particular prospective customer (with the characteristics previously identified) in a manner that provides the service in a most satisfactory manner from the perspective of the prospective customer and provides the business with the highest chance in completing a transaction involving a service or product is identified. The telephone call is then connected to the communication device of the identified free agent to service the prospective customer. In this manner, auto dialer systems are enhanced by determining the appropriate agent to service the prospective customer.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Figure 1:
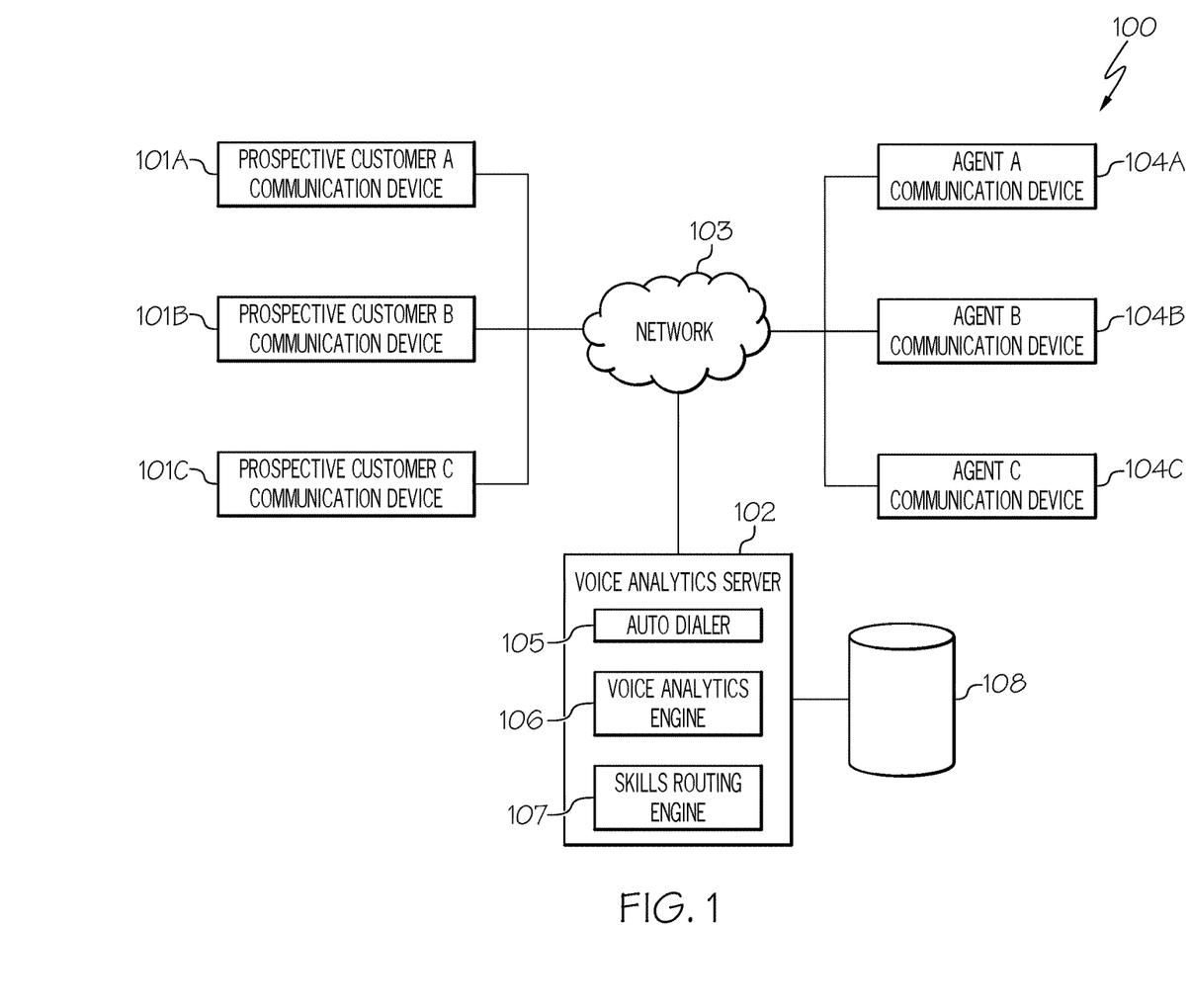
FIG. 1 illustrates a communication system for practicing the principles of the present disclosure in accordance with an embodiment of the present disclosure.

Referring now to the Figures in detail, FIG. 1 illustrates a communication system 100 for practicing the principles of the present disclosure in accordance with an embodiment of the present disclosure. Communication system 100 includes communication devices 101A-101C (identified as "Prospective Customer A Communication Device," "Prospective Customer B Communication Device," and "Prospective Customer C Communication Device," respectively, in FIG. 1) connected to a voice analytics server 102 via a network 103. Communication devices 101A-101C may collectively or individually be referred to as communication devices 101 or communication device 101, respectively. It is noted that both communication devices 101 and the users of communication devices 101 (i.e., the prospective customers) may be identified with element number 101. A "prospective customer," as used herein, refers to a user who receives a telephone call on his/her communication device 101 from an auto dialer (discussed further below).

Furthermore, as shown in FIG. 1, communication system 100 includes communication devices 104A-104C (identified as "Agent A Communication Device," "Agent B Communication Device," and "Agent C Communication Device," respectively, in FIG. 1) connected to voice analytics server 102 via network 103. Communication devices 104A-104C may collectively or individually be referred to as communication devices 104 or communication device 104, respectively. It is noted that both communication devices 104 and the users of communication devices 104 (i.e., the agents) may be identified with element number 104. An "agent," as used herein, refers to a user who handles calls for a business and speaks with a prospective customer regarding a service or product. Typically, the agent is attempting to complete a transaction involving a service or product with the prospective customer.

Communication devices 101, 104 may be any telephonic device, such as a telephone, a cellular phone, a satellite phone, a portable computing unit, a Personal Digital Assistant (PDA), a mobile phone and the like configured with the capability for performing communications, such as between the communication device 101, 104 and a call center (discussed further below) and between the communication devices 101, 104. Communication device 101, 104 may have various inputs/outputs with which the user (caller) may interact to provide and receive audio, text, video, and other forms of data.

Network 103 may include a circuit-switched voice or data network, a packet-switched voice or data network, or any other network able to carry voice and/or data, for example, Internet Protocol (IP)-based or asynchronous transfer mode (ATM)-based networks, including wired or wireless networks. Network 103 may be configured to handle voice traffic, for example, Voice over IP (VOIP) network. Network 103 also may be configured to handle web traffic, such as hypertext transfer protocol (HTTP) traffic and hypertext markup language (HTML) traffic. Network 103 may also include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G), Fourth Generation (4G) or Fifth Generation (5G) mobile telecommunications networks, a wired Ethernet network, a private network, such as an intranet, radio, television, cable, satellite, and/or any other delivery or tunneling mechanism for carrying data, or any appropriate combination of such networks.

In one embodiment, voice analytics server 102 may reside within a call center, such as a centralized office used for transmitting a large volume of enquiries by telephone via network 103. In one embodiment, voice analytics server 102 is configured to analyze a voice response from a prospective customer 101 to a telephone call made by an auto dialer to determine the appropriate agent 104 to service the prospective customer 101 so that the prospective customer 101 is serviced in a most satisfactory manner from the perspective of the prospective customer 101 and the business has the highest chance in completing a transaction involving a service or product.

Voice analytics server 102 includes the following components to achieve such features. In one embodiment, voice analytics server 102 includes an auto dialer 105 configured to automatically dial telephone numbers. In one embodiment, auto dialer 105 is a software component. Examples of such auto dialers 105 include PhoneBurner®, Five9®, ChaseData®, CallHub®, RingCentral®, and Voicent®. In an alternative embodiment, auto dialer 105 is an electronic device separate from voice analytics server 102.

In one embodiment, auto dialer 105 determines if a human responds to the phone call using voice detection technology. By utilizing voice detection technology, auto dialer 105 detects the difference between an answering machine and a human voice. For example, if nobody picks up the phone for four rings or more, about 25 seconds, then there is an increased likelihood that the call will be answered by a machine. When the call is answered, the software (voice detection technology) measures the length of the first words spoken and waits for a pause. If the initial response is a short burst of words (one to three seconds) followed by a pause, then it is a human.

In one embodiment, voice analytics server 102 includes a voice analytics engine 106 configured to analyze a voice response by a prospective customer 101 in response to a telephone call made by auto dialer 105. Such analysis involves determining characteristics, such as age, gender, language, mood, emotion, etc. of prospective customer 101 based on analyzing the voice pattern, such as pitch, tone, speed and power, of the voice response. In one embodiment, voice analytics engine determines such characteristics using a software component, such as Empath®.

In one embodiment, voice analytics engine 106 utilizes a tone analyzer to determine characteristics, such as emotion, of prospective customer 101 based on the tone of the voice response. Such a tone analyzer is built by first using software to analyze speech by extracting characteristics of the speech waveform that can be used as features to train a machine learning classifier. Given a collection of speech recordings, manually labelled with the emotion expressed, vector representations of each recording are constructed using the extracted features. In one embodiment, feature extraction is accomplished by changing the speech waveform to a form of parametric representation at a relatively minimized data rate for subsequent processing and analysis. Exemplar speech feature extraction techniques include Mel Frequency Cepstral Coefficients (MFCC), Linear Prediction Coefficients (LPC), Linear Prediction Cepstral Coefficients (LPCC), Line Spectral Frequencies (LSF), Discrete Wavelet Transform (DWT) and Perceptual Linear Prediction (PLP).

Once the features are extracted and the vector representations of speech constructed, a classifier is trained to detect emotions. Examples of classifiers include Support Vector Machines (SVM), Logistic Regressions (Logit), Hidden Markov Models (HMM), and Neural Networks (NN).

In one embodiment, voice analytics engine 106 utilizes natural language processing to map words used by prospective customer 101 to characteristics, such as a type of emotion (e.g., angry). For example, speech recognition software may be used to recognize and translate spoken words into text. Examples of such speech recognition software include Braina Pro, e-Speaking, IBM® Watson Speech to Text, Amazon® Transcribe, etc. In one embodiment, speech recognition may be implemented in auto dialer 105, such as DealerAI.

Upon recognizing and translating the spoken words into text, the text may be analyzed to detect communication tones categorized as emotion, language and social using IBM® Watson Tone Analyzer. The emotion tones are categorized as anger, disgust, fear, joy and sadness. The language tones are categorized as analytical, confident and tentative. The social tones are categorized as openness, conscientiousness, extraversion, agreeableness and emotional range.

In one embodiment, mood and emotions may be recognized from text using the keyword spotting technique by voice analytics engine 106. In such a technique, text is converted into tokens, and from these tokens, mood and emotion words are identified and detected. Initially, this technique will take some text as input and in the next step tokenization is performed to the input text. Words related to mood and emotions will be identified in the next step. Afterwards, analysis of the intensity of mood and emotion words will be performed. A mood and emotion class may then be found as the required output.

In another embodiment, mood and emotions may be recognized from text using the lexical affinity method. In such a technique, it assigns a probability affinity for a particular mood or emotion to arbitrary words apart from picking up emotional keywords.

In another embodiment, moods and emotions may be recognized from text using learning-based methods. In such a technique, the problem is defined to classify the input texts into different moods and emotions. Unlike keyword-based detection methods, learning-based methods try to detect mood and emotions based on a previously trained classifier, which apply machine learning, such as support vector machines and conditional random fields, to determine which mood and emotion category should the input text belongs.

In one embodiment, mood and emotions may be recognized from text using an ontology. For example, an emotion ontology may be utilized which includes a class and subclass relationship format. Mood and emotion classes at the primary level in the hierarchy are at the top of the ontology and mood and emotion classes at the tertiary level are at the bottom of the hierarchy. High weight is assigned to the upper level classes and low weight is assigned to the lower level classes. Mood and emotion of the textual data may then be recognized by calculating weights for a particular mood and emotion by adding weights assigned at each level of the hierarchy as well as calculating the weight for its counter mood and emotion. Both scores are compared and the greater one is taken as the detected mood and emotion.

In one embodiment, the age and gender of prospective customer 101 is estimated by voice analytics engine 106 using a hybrid architecture of weighted supervised non-negative matrix factorization and general regression neural network.

In one embodiment, the age, gender and language of prospective customer 101 is estimated by utilizing an automatic speech-based classification scheme to classify the speaker characteristics. In the training phase, speech data are grouped into speaker groups according to the speakers' gender, age and language. Voice features are then extracted to feature vectors which are used to train speaker characteristic models with different techniques which are Vector Quantization, Gaussian Mixture Model and Support Vector Machine. Fusion of Classification results from those groups is then performed to obtain final classification results for each characteristic.

In one embodiment, voice analytics engine 106 creates a profile of prospective customer 101 after analyzing the voice response of prospective customer 101. Such a profile includes the characteristics extracted from the voice response of prospective customer 101, such as age, gender, language, mood and emotion. In one embodiment, such a profile is stored in a database 108 connected to voice analytics server 102.

In one embodiment, voice analytics engine 106 analyzes the voice pattern of agent 104 in a similar manner as discussed above in connection with prospective customer 101 to determine characteristics of agent 104, such as tone, mood and emotion.

In one embodiment, voice analytics server 102 further includes a skills routing engine 107 configured to route the call (i.e., connect the call) to the appropriate free agent 104 to service prospective customer 101. In one embodiment, skills routing engine 107 keeps track of which agents 104 have been assigned to service a prospective customer 101 and which have not been assigned to service a prospective customer 101. Such information may be stored in a table, in which an entry may indicate a true or false value based on whether the associated agent 104 has been assigned to service a prospective customer 101. As a result, in one embodiment, skills routing engine 107 may perform a table look-up to determine whether an agent 104 is available or not available to service prospective customer 101.

In one embodiment, skills routing engine 107 analyzes the profiles of agents 104 available to service the prospective customer 101 as well as analyzes the profile of prospective customer 101. Such an analysis involves assessing the characteristics of agents 104 and prospective customer 101. For example, the profiles of agents 104 may include an assessment of the skills of agents 104, such as based on a skills test provided to agents, as well as an assessment of the personality of agents 104, such as based on a personality test provided to agents 104. Examples of such tests include the Customer Service Aptitude Profile (CSAP) test and the Sales Achievement Predictor (SalesAP) test prepared by Criteria Corp. as well as the e-Skill test and Elite test prepared by Success Performance Solutions.

Such assessments may determine various characteristics of agents 104, such as friendliness, patience, listening capacity, and communication skills. Other characteristics may be directly provided by agent 104 (or employer), such as the language and age of agent 104.

By analyzing the profiles of agents 104 and prospective customer 101, skills routing engine 107 identifies the appropriate agent 104 to service prospective customer 101 with a personality trait that most closely aligns to best service an individual with the determined characteristics of prospective customer 101. For instance, if prospective customer 101 has the characteristic of being impatient, then skills routing engine 107 will route the call to an agent 104 that possesses patience. If prospective customer 101 has the characteristic of being perturbed or angry, then skills routing engine 107 will rout the call to an agent 104 that possesses the skills in handling such characteristics, such as someone with great listening capacity.

In one embodiment, skills routing engine 107 selects the appropriate agent 104 to service prospective customer 101 based on performing a table look-up in which the table includes a list of prospective customer characteristics (characteristics of prospective customers 101 discussed above) matched with a list of agent characteristics (characteristics of agents 104 discussed above). Those agents 104 with the greatest number of characteristics (or the greatest ratings in such characteristics as discussed below) that match the prospective customer characteristics are identified. The agent 104 with the greatest number of characteristics (or the greatest ratings in such characteristics as discussed below) that match the prospective customer characteristics who is available to service prospective customer 101 is then selected to service prospective customer 101.

In one embodiment, such characteristics may be assigned a value attributing to the degree that the agent 104 possesses such a characteristic. For example, such a value may be normalized between the values of 0 to 1, where the higher value indicates possessing a greater degree of the characteristic and a lower value indicates possessing a lesser degree of the characteristic. For instance, if agent 104A was assigned a value of 0.7 for friendliness, then that agent 104 would be assessed having a higher degree of friendliness than another agent assigned a lower value.

As a result, skills routing engine 107 will select the agent 104 based on the values attributed to the agent's characteristics that are required to service prospective customer 101 appropriately. For example, skills routing engine 107 may assign the agent 104 with a higher value of friendliness everything being equal if such a characteristic is deemed to be important for serving prospective customer 101 with the characteristics possessed by prospective customer 101.

In one embodiment, skills routing engine 107 selects the appropriate agent 104 using a data mining algorithm (e.g., k-mean algorithm, Support Vector Machine (SVM), Apriori algorithm, expectation-maximization algorithm, kNN algorithm), in which the characteristics of agents 104 and prospective customers 101 are inputted and a model of pairing agents 104 and prospective customers 101 based on such characteristics that enables prospective customer 101 to be serviced in a most satisfactory manner from the perspective of the prospective customer 101 as well as achieve a high chance in completing a transaction involving a service or product.

In one embodiment, skills routing engine 107 selects the appropriate agent 104 using a machine learning algorithm (e.g., supervised learning) to build a mathematical model based on sample data consisting of agent characteristics (characteristics of agents 104 discussed above) that match customer characteristics (characteristics of prospective customers 101 discussed above) in terms of providing service to prospective customer 101 in a most satisfactory manner from the perspective of the prospective customer 101 as well as achieve a high chance in completing a transaction involving a service or product. Such a data set is referred to herein as the "training data" which is used by the machine learning algorithm to make predictions or decisions without being explicitly programmed to perform the task. Such a training set is provided by an expert in identifying the appropriate agent 104 in assisting prospective customer 101 based on matching characteristics of agents 104 with characteristics of prospective customers 101. Examples of such supervised learning algorithms include nearest neighbor, Naïve Bayes, decision trees, linear regression, support vector machines and neural networks.

In one embodiment, the machine learning model corresponds to a classification model trained to predict the agent 104 to service prospective customers 101 based on the training set.

A description of the hardware configuration of voice analytics system 102 is provided below in connection with FIG. 2.

System 100 is not to be limited in scope to any one particular network architecture. System 100 may include any number of communication devices 101, 104, voice analytics servers 102, networks 103, auto dialers 105, voice analytics engines 106, skills routing engines 107 and databases 108.

Figure 2:
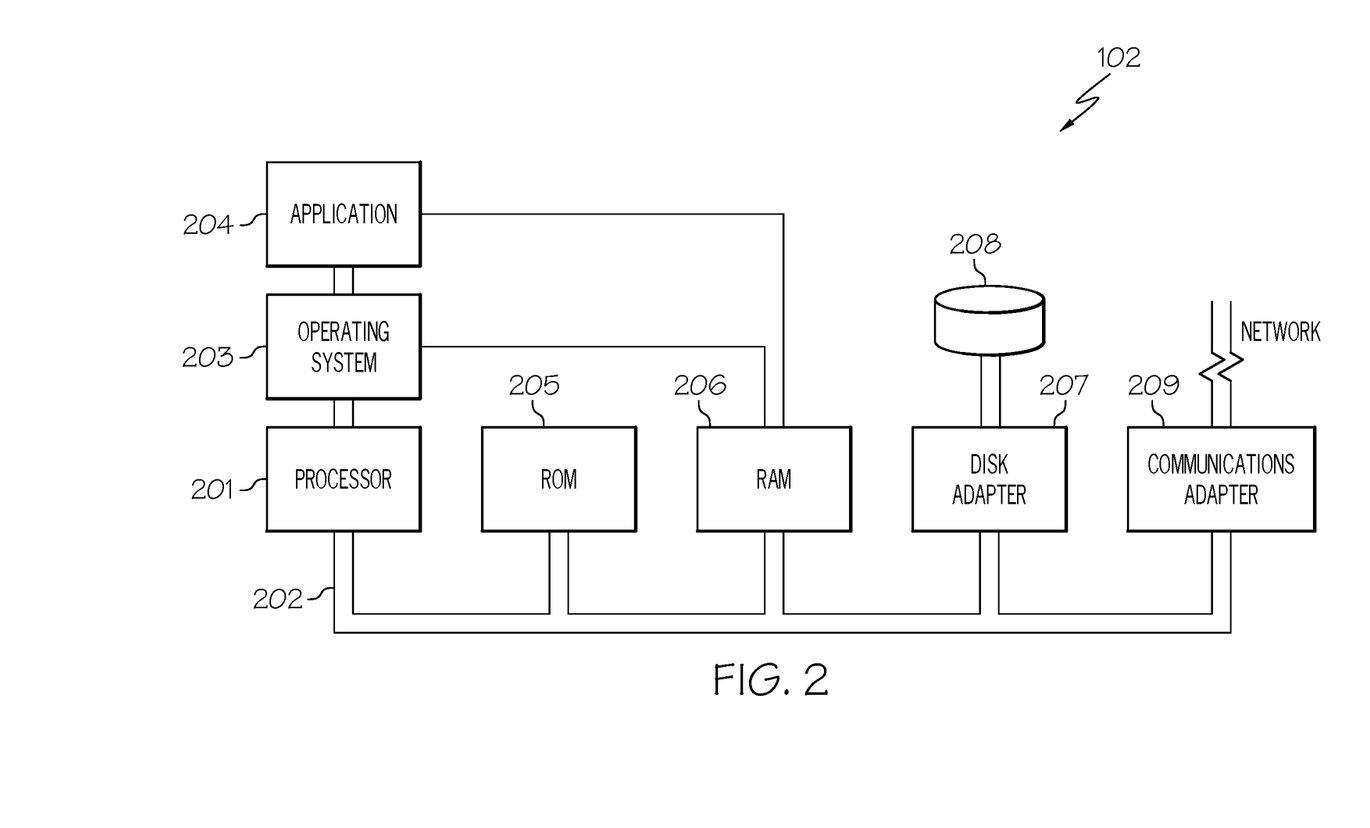
FIG. 2 illustrates an embodiment of the present disclosure of a hardware configuration of the voice analytics server.

Referring now to FIG. 2, FIG. 2 illustrates an embodiment of the present disclosure of the hardware configuration of voice analytics server 102 (FIG. 1) which is representative of a hardware environment for practicing the present disclosure.

Voice analytics server 102 has a processor 201 connected to various other components by system bus 202. An operating system 203 runs on processor 201 and provides control and coordinates the functions of the various components of FIG. 2. An application 204 in accordance with the principles of the present disclosure runs in conjunction with operating system 203 and provides calls to operating system 203 where the calls implement the various functions or services to be performed by application 204. Application 204 may include, for example, a program for enhancing auto dialer systems by analyzing a voice response from a prospective customer to a telephone call made by the auto dialer to determine the appropriate agent to service the prospective customer as discussed further below in connection with FIGS. 3-5.

Referring again to FIG. 2, read-only memory ("ROM") 205 is connected to system bus 202 and includes a basic input/output system ("BIOS") that controls certain basic functions of voice analytics server 102. Random access memory ("RAM") 206 and disk adapter 207 are also connected to system bus 202. It should be noted that software components including operating system 203 and application 204 may be loaded into RAM 206, which may be voice analytics server's 102 main memory for execution. Disk adapter 207 may be an integrated drive electronics ("IDE")

adapter that communicates with a disk unit 208, e.g., disk drive. It is noted that the program for enhancing auto dialer systems by analyzing a voice response from the prospective customer to a telephone call made by the auto dialer to determine the appropriate agent to service the prospective customer, as discussed further below in connection with FIGS. 3-5, may reside in disk unit 208 or in application 204.

Voice analytics server 102 may further include a communications adapter 209 connected to bus 202. Communications adapter 209 interconnects bus 202 with an outside network (e.g., network 103 of FIG. 1) to communicate with other devices.

In one embodiment, application 204 of voice analytics server 102 includes the software components of auto dialer 105 (FIG. 1) configured to automatically dial telephone numbers, voice analytics engine 106 (FIG. 1) configured to analyze a voice response from a prospective customer 101 (FIG. 1) in response to a telephone call made by auto dialer 105, and skills routing engine 107 (FIG. 1) configured to route the call (i.e., connect the call) to the appropriate free agent 104 (FIG. 1) to service prospective customer 101. In one embodiment, such components may be implemented in hardware, where such hardware components would be connected to bus 202. The functions discussed above performed by such components are not generic computer functions. As a result, voice analytics server 102 is a particular machine that is the result of implementing specific, non-generic computer functions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, an important technology for auto dialers is the ability to distinguish between live human pick-ups from answering machines. Since there is no indication hardware signal when a call is answered by an answering machine or voice-mail system, auto dialer systems have to analyze incoming audio for a prediction. After making such a prediction, if the prediction is that there has been a live human pick-up, the auto dialer connects the answered call to a live agent. The live agent though may not be the best suited agent to service the prospective customer. Unfortunately, auto dialers do not include technology to connect the call to the live agent that would be best to service the prospective customer.

Figure 3:
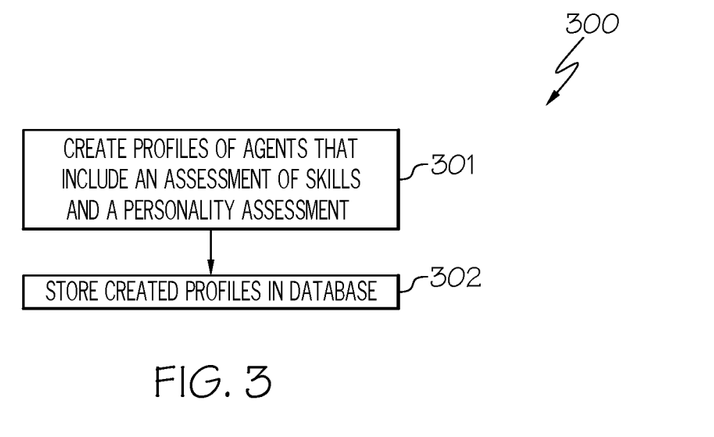
FIG. 3 is a flowchart of a method for storing profiles of agents in a database in accordance with an embodiment of the present disclosure.
Figure 4:
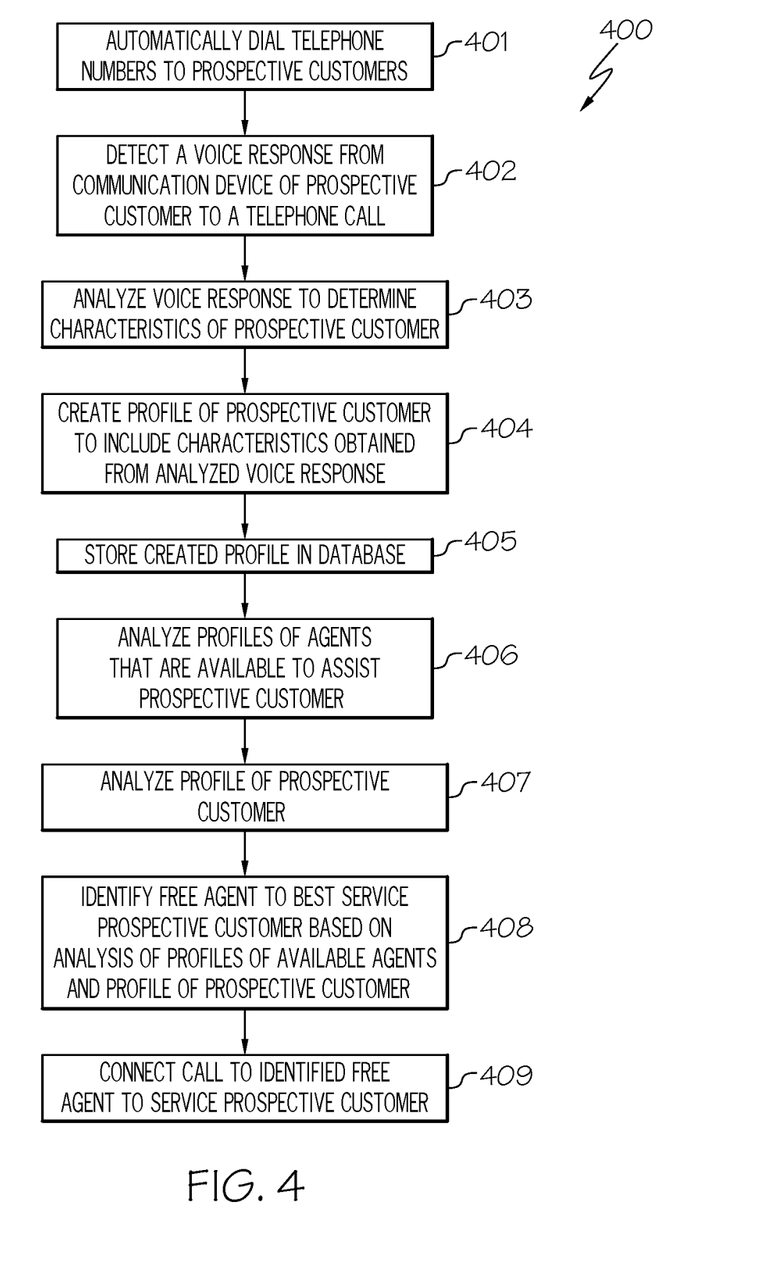
FIG. 4 is a flowchart of a method for enhancing auto dialer systems by analyzing a voice response from the prospective customer to a telephone call made by the auto dialer to determine the appropriate agent to service the prospective customer in accordance with an embodiment of the present disclosure.
Figure 5:
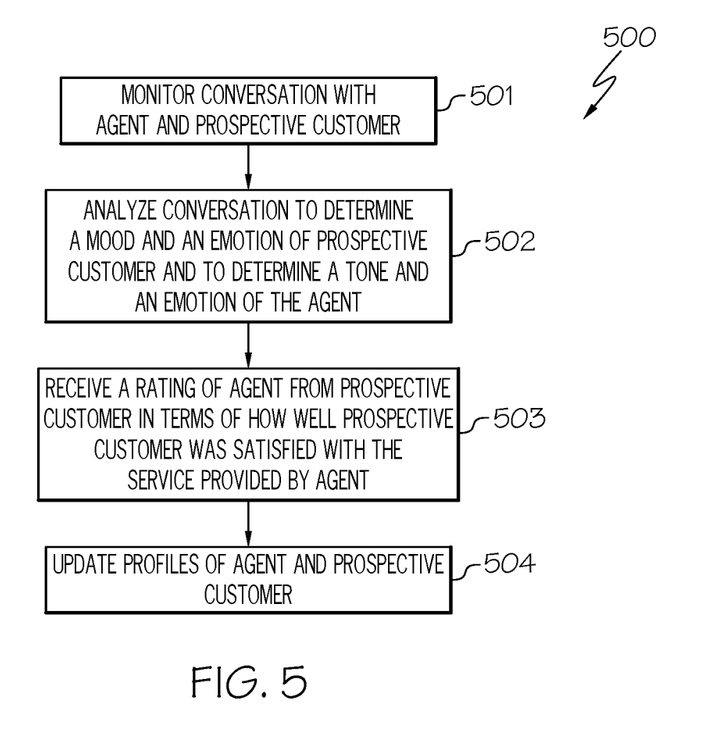
FIG. 5 is a flowchart of a method for updating the profiles of the prospective customer as well as the agent servicing the prospective customer in light of the telephone conversation between the parties in accordance with an embodiment of the present disclosure.

The embodiments of the present disclosure provide a means for improving the technology or technical field of auto dialer systems by analyzing a voice response from the prospective customer to a telephone call made by the auto dialer to determine the appropriate agent to service the prospective customer as discussed below in connection with FIGS. 3-5. FIG. 3 is a flowchart of a method for storing profiles of agents 104 (FIG. 1) in a database (e.g., database 108 of FIG. 1). FIG. 4 is a flowchart of a method for enhancing auto dialer systems by analyzing a voice response from prospective customer 101 (FIG. 1) to a telephone call made by auto dialer 105 (FIG. 1) to determine the appropriate agent 104 to service prospective customer 101. FIG. 5 is a flowchart of a method for updating the profiles of prospective customer 101 as well as the agent 104 servicing prospective customer 101 in light of the telephone conversation between the parties.

As stated above, FIG. 3 is a flowchart of a method 300 for storing profiles of agents 104 (FIG. 1) in a database (e.g., database 108 of FIG. 1) in accordance with an embodiment of the present disclosure.

Referring to FIG. 3, in conjunction with FIGS. 1-2, in step 301, voice analytics server 102 creates profiles of agents 104 that include an assessment of the skills of agents 104, such as based on a skills test provided to agents 104. Furthermore, such profiles may further include a personality assessment of agents 104, such as based on a personality test provided to agents 104. As previously discussed, examples of such tests include the Customer Service Aptitude Profile (CSAP) test and the Sales Achievement Predictor (SalesAP) test provided by Criteria Corp. as well as the e-Skill test and the Elite test provided by Success Performance Solutions.

Such assessments may determine various characteristics of agents 104, such as friendliness, patience, listening capacity, and communication skills. Other characteristics may be directly provided by agent 104 (or employer), such as the language and age of agent 104.

In one embodiment, such characteristics may be assigned a value attributing to the degree that the agent 104 possesses such a characteristic. For example, such a value may be normalized between the values of 0 to 1, where the higher value indicates possessing a greater degree of the characteristic and a lower value indicates possessing a lesser degree of the characteristic. For instance, if agent 104A was assigned a value of 0.7 for friendliness, then that agent 104 would be assessed having a higher degree of friendliness than another agent assigned a lower value for that characteristic.

In one embodiment, the degree of a characteristic possessed by an agent 104 is based on the evaluation of the skills and personality tests discussed above.

In step 302, voice analytics server 102 stores the created profiles (created in step 301) in a database, such as database 108. These profiles will be accessed by skills routing engine 107 to determine the appropriate agent 104 to service prospective customer 101 as discussed below in connection with FIG. 4.

FIG. 4 is a flowchart of a method 400 for enhancing auto dialer systems by analyzing a voice response from prospective customer 101 (FIG. 1) to a telephone call made by auto dialer 105 (FIG. 1) to determine the appropriate agent 104 to service prospective customer 101 in accordance with an embodiment of the present disclosure.

Referring to FIG. 4, in conjunction with FIGS. 1-3, in step 401, auto dialer 105 of voice analytics server 102 automatically dials telephone numbers to prospective customers 101.

In step 402, auto dialer 105 of voice analytics server 102 detects a voice response from a communication device 101 of a prospective customer to a telephone call made by auto dialer 105. As previously discussed, auto dialer 105 includes voice detection technology that allows auto dialer 105 to detect the difference between an answering machine and a human voice. For example, if nobody picks up the phone for four rings or more, about 25 seconds, then there is an increased likelihood that the call will be answered by a machine. When the call is answered, the software (voice detection technology) measures the length of the first words spoken and waits for a pause. If the initial response is a short burst of words (one to three seconds) followed by a pause, then it is a human.

In step 403, voice analytics engine 106 of voice analytics server 102 analyzes the voice response to determine the characteristics of prospective customer 101, such as age, gender, language, mood, emotions, etc.

As discussed above, in one embodiment, voice analytics engine 106 determines the characteristics of prospective customer 101, such as age, gender, language, mood and emotion, based on analyzing the voice pattern, such as pitch, tone, speed and power, of the voice response. For example, voice analytics engine 106 may utilize software, such as Empath®, to determine such characteristics.

In one embodiment, voice analytics engine 106 utilizes a tone analyzer to determine characteristics, such as mood and emotion, of prospective customer 101 based on the tone of the voice response. Such a tone analyzer is built by first using software to analyze speech by extracting characteristics of the speech waveform that can be used as features to train a machine learning classifier Given a collection of speech recordings, manually labelled with the motion and emotion expressed, vector representations of each recording are constructed using the extracted features. In one embodiment, feature extraction is accomplished by changing the speech waveform to a form of parametric representation at a relatively minimized data rate for subsequent processing and analysis. Exemplar speech feature extraction techniques include Mel Frequency Cepstral Coefficients (MFCC), Linear Prediction Coefficients (LPC), Linear Prediction Cepstral Coefficients (LPCC), Line Spectral Frequencies (LSF), Discrete Wavelet Transform (DWT) and Perceptual Linear Prediction (PLP).

Once the features are extracted and the vector representations of speech constructed, a classifier is trained to detect emotions. Examples of classifiers include Support Vector Machines (SVM), Logistic Regressions (Logit), Hidden Markov Models (HMM), and Neural Networks (NN).

In one embodiment, voice analytics engine 106 utilizes natural language processing to map words used by prospective customer 101 to characteristics, such as a type of emotion (e.g., angry). For example, speech recognition software may be used to recognize and translate spoken words into text. Examples of such speech recognition software include Braina Pro, e-Speaking, IBM® Watson Speech to Text, Amazon® Transcribe, etc. In one embodiment, speech recognition may be implemented in auto dialer 105, such as DealerAI.

Upon recognizing and translating the spoken words into text, the text may be analyzed to detect communication tones categorized as emotion, language and social using IBM® Watson Tone Analyzer. The emotion tones are categorized as anger, disgust, fear, joy and sadness. The language tones are categorized as analytical, confident and tentative. The social tones are categorized as openness, conscientiousness, extraversion, agreeableness and emotional range.

In one embodiment, mood and emotions may be recognized from text using the keyword spotting technique by voice analytics engine 106. In such a technique, text is converted into tokens and from these tokens mood and emotion words are identified and detected. Initially, this technique will take some text as input and in the next step tokenization is performed to the input text. Words related to moods and emotions will be identified in the next step. Afterwards, analysis of the intensity of mood and emotion words will be performed. A mood and emotion class may then be found as the required output.

In another embodiment, mood and emotions may be recognized from text using the lexical affinity method. In such a technique, it assigns a probability affinity for a particular mood and emotion to arbitrary words apart from picking up mood and emotional keywords.

In another embodiment, moods and emotions may be recognized from text using learning-based methods. In such a technique, the problem is defined to classify the input texts into different moods and emotions. Unlike keyword-based detection methods, learning-based methods try to detect moods and emotions based on a previously trained classifier, which apply machine learning, such as support vector machines and conditional random fields, to determine which mood and emotion category should the input text belongs.

In one embodiment, moods and emotions may be recognized from text using an ontology. For example, a mood and emotion ontology may be utilized which includes a class and subclass relationship format. Mood and emotion classes at the primary level in the hierarchy are at the top of the ontology and mood and emotion classes at the tertiary level are at the bottom of the hierarchy. High weight is assigned to the upper level classes and low weight is assigned to the lower level classes. Mood and emotion of the textual data may then be recognized by calculating weights for a particular mood and emotion by adding weights assigned at each level of the hierarchy as well as calculating the weight for its counter mood and emotion. Both scores are compared and the greater one is taken as the detected mood and emotion.

In one embodiment, the age and gender of prospective customer 101 is estimated by voice analytics engine 106 using a hybrid architecture of weighted supervised non-negative matrix factorization and general regression neural network.

In one embodiment, the age, gender and language of prospective customer 101 is estimated by utilizing an automatic speech-based classification scheme to classify the speaker characteristics. In the training phase, speech data are grouped into speaker groups according to the speakers' gender, age and language. Voice features are then extracted to feature vectors which are used to train speaker characteristic models with different techniques which are Vector Quantization, Gaussian Mixture Model and Support Vector Machine. Fusion of classification results from those groups is then performed to obtain final classification results for each characteristic.

Referring again to FIG. 4, in conjunction with FIGS. 1-3, in step 404, voice analytics engine 106 of voice analytics server 102 creates a profile of prospective customer 101 to include the characteristics of prospective customer 101 obtained from analyzing the voice response in step 403. Such a profile includes the characteristics extracted from the voice response of prospective customer 101, such as age, gender, language, mood and emotion.

In step 405, voice analytics engine 106 of voice analytics server 102 stores the created profile (profile created in step 404) in a database, such as database 108.

In step 406, skills routing engine 107 of voice analytics server 102 analyzes the profiles of agents 104 that are available to assist prospective customer 101. As previously discussed, such profiles of agents 104 include characteristics of these agents 104, such as friendliness, patience, empathy, listening capacity, language, communication skills and age.

As discussed above, in one embodiment, skills routing engine 107 keeps track of which agents 104 have been assigned to service a prospective customer 101 and which have not been assigned to service a prospective customer 101. Such information may be stored in a table, in which an entry may indicate a true or false value based on whether the associated agent 104 has been assigned to service a prospective customer 101. As a result, in one embodiment, skills routing engine 107 may perform a table look-up to determine whether an agent 104 is available or not available to service prospective customer 101.

In step 407, skills routing engine 107 of voice analytics server 102 analyzes the profile of prospective customer 101.

In step 408, skills routing engine 107 identifies a free agent 104 from the agents 104 that are available to assist prospective customer 101 based on the analysis of the profiles (profiles of agents 104 that are available to assist prospective customer 101) containing the characteristics of agents 104 that are available to assist prospective customer 101 and based on the analysis of the profile (profile of prospective customer 101) containing the characteristics of prospective customer 101.

As previously discussed, by analyzing the profiles of agents 104 and prospective customer 101, skills routing engine 107 identifies the appropriate agent 104 to service prospective customer 101 with a personality trait that most closely aligns to best service an individual with the determined characteristics of prospective customer 101. For instance, if prospective customer 101 has the characteristic of being impatient, then skills routing engine 107 will route the call to an agent 104 that possesses patience. If prospective customer 101 has the characteristic of being perturbed or angry, then skills routing engine 107 will rout the call to an agent 104 that possesses the skills in handling such characteristics, such as someone with great listening capacity.

In one embodiment, skills routing engine 107 selects the appropriate agent 104 to service prospective customer 101 based on performing a table look-up in which the table includes a list of prospective customer characteristics (characteristics of prospective customers 101 discussed above) matched with a list of agent characteristics (characteristics of agents 104 discussed above). Those agents 104 with the greatest number of characteristics that match the prospective customer characteristics are identified. The agent 104 with the greatest number of characteristics that match the prospective customer characteristics who is available to service prospective customer 101 is then selected to service prospective customer 101.

In one embodiment, such characteristics may be assigned a value attributing to the degree that the agent 104 possesses such a characteristic. For example, such a value may be normalized between the values of 0 to 1, where the higher value indicates possessing a greater degree of the characteristic and a lower values indicates possessing a lesser degree of the characteristic. For instance, if agent 104A was assigned a value of 0.7 for friendliness, then that agent 104 would be assessed having a higher degree of friendliness than another agent assigned a lower value for that characteristic.

As a result, skills routing engine 107 will select the agent 104 based on the values attributed to the agent's characteristics that are required to service prospective customer 101 appropriately. For example, skills routing engine 107 may assign the agent 104 with a higher value of friendliness everything being equal if such a characteristic is deemed to be important for serving prospective customer 101 with the characteristics possessed by prospective customer 101.

In one embodiment, skills routing engine 107 selects the appropriate agent 104 using a data mining algorithm (e.g., k-mean algorithm, Support Vector Machine (SVM), Apriori algorithm, expectation-maximization algorithm, kNN algorithm), in which the characteristics of agents 104 and prospective customers 101 are inputted and a model of pairing agents 104 and prospective customers 101 based on such characteristics that enables prospective customer 101 to be serviced in a most satisfactory manner from the perspective of the prospective customer 101 as well as achieve a high chance in completing a transaction involving a service or product.

In one embodiment, skills routing engine 107 selects the appropriate agent 104 using a machine learning algorithm (e.g., supervised learning) to build a mathematical model based on sample data consisting of agent characteristics (characteristics of agents 104 discussed above) that match customer characteristics (characteristics of prospective customers 101 discussed above) in terms of providing service to prospective customer 101 in a most satisfactory manner from the perspective of the prospective customer 101 as well as achieve a high chance in completing a transaction involving a service or product. Such a data set is referred to herein as the "training data" which is used by the machine learning algorithm to make predictions or decisions without being explicitly programmed to perform the task. Such a training set is provided by an expert in identifying the appropriate agent 104 in assisting prospective customer 101 based on matching characteristics of agents 104 with characteristics of prospective customers 101. Examples of such supervised learning algorithms include nearest neighbor, Naïve Bayes, decision trees, linear regression, support vector machines and neural networks.

In one embodiment, the machine learning model corresponds to a classification model trained to predict the agent 104 to service prospective customers 101 based on the training set.

In step 409, skills routing engine 107 of voice analytics server 102 connects the telephone call to the communication device 104 of the identified free agent to service prospective customer 101.

After establishing the connection between the free agent 104 and prospective customer 101, voice analytics server 102 may continue to monitor and analyze the communication in order to update the profiles of the free agent 104 and prospective customer 101 to ensure that the most appropriate agent is assigned to service prospective customer 101 as discussed below in connection with FIG. 5.

FIG. 5 is a flowchart of a method 500 for updating the profiles of prospective customer 101 as well as the agent 104 servicing prospective customer 101 in light of the telephone conversation between the parties in accordance with an embodiment of the present invention.

Referring to FIG. 5, in conjunction with FIGS. 1-4, in step 501, voice analytics server 102 monitors the conversation with agent 104 (identified free agent) and prospective customer 101. For example, voice analytics server 102 may implement call monitoring using the call monitoring software from Ringover.

In step 502, voice analytics server 102 analyzes the conversation to determine a mood and an emotion of prospective customer 101 and to determine a tone and an emotion of the identified free agent 104.

In one embodiment, the mood or emotion of prospective customer 101 or agent 104 may be determined using natural language processing. For example, speech recognition software may be used to recognize and translate spoken words into text. Examples of such speech recognition software include Braina Pro, e-Speaking, IBM® Watson Speech to Text, Amazon® Transcribe, etc. In one embodiment, speech recognition may be implemented in auto dialer 105, such as DealerAI.

After translating the spoken words into text, voice analytics server 102 may utilize natural language processing to identify terms that map to tables of terms related to a mood or emotion. For example, if the term "happy" or "good" is used, then such a term may be listed in the table of mood terms indicating a cheerful mood. In another example, if the terms "not satisfied," or "disappointed" were used, then such terms may be listed in the table of emotion terms indicating the emotion of anger. By mapping the identified terms to such tables, voice analytics server 102 may identify the mood or emotion of agent 104 and prospective customer 101.

In one embodiment, the tone of agent 104 used during the conversation is determined using IBM® Watson Tone Analyzer which categorizes the communication tones from text (after the speech has been translated to text) into the categories of emotion, language and social. The emotion tones are categorized as anger, disgust, fear, joy and sadness. The language tones are categorized as analytical, confident and tentative. The social tones are categorized as openness, conscientiousness, extraversion, and agreeableness.

In one embodiment, voice analytics server 102 detects which individual (agent 104 or prospective customer 101) is talking based on analyzing the acoustic features of speech (a voiceprint) and then matching the voiceprint to an individual, such as an agent 104 on file. For example, the voiceprint of agent 104 may be stored in the agent's profile, which can be matched when such a voiceprint is detected. An exemplary voiceprint detection software that uses the voiceprint as a biometric to ascertain an individual's identity is Loquendo's speaker verification software tool. In one embodiment, since every agent 104 has a voiceprint stored in its profile, a detected voiceprint that does not match any of the stored voiceprints would be assumed to correspond to the voiceprint of prospective customer 101. In one embodiment, the profile of prospective customer 101 may store a voiceprint of prospective customer 101 at the time of creation of the profile for prospective customer 101.

By detecting which individual (agent 104 or prospective customer 101) is talking, voice analytics server 102 will be able to assess the mood/emotion from the appropriate individual.

In step 503, voice analytics server 102 receives a rating of agent 104 (identified free agent) from prospective customer 101 in terms of how well prospective customer 101 was satisfied with the service provided by agent 104. For example, at the end of the telephone call between agent 104 and prospective customer 101, voice analytics server 102 may request prospective customer 101 to participate in a survey rating agent 104 in terms of the service provided by agent 104. Based on the feedback provided by customer 101, the profiles of prospective customer 101 and agent 104 may be updated to reflect the success or lack of success (success being how satisfied prospective customer 101 was with the service provided by agent 104 as well as how successful agent 104 was in completing the transaction with prospective customer 101 to purchase a product or service) in pairing such individuals with the characteristics they possess. Such information may be utilized by skills routing engine 107 to match agents 104 and prospective customers 101 more appropriately. For example, such information may be utilized by the expert to provide a more accurate training data to the machine learning algorithm (e.g., supervised learning) to build a more accurate mathematical model to identify the appropriate agent 104. In another example, the tables matching characteristics of agents 104 with the characteristics of prospective customers 101 may need to be updated.

In step 504, voice analytics server 102 updates the profile of agent 104 (i.e., the identified free agent 104) and the profile of prospective customer 101 based on the analysis of the conversation and the received rating of agent 104. For example, the profile of agent 104 may be updated to reflect that agent 104 is more friendly than previously thought. In another example, the profile of prospective customer 101 may be updated to reflect that prospective customer 101 prefers individuals who are direct to the point. In a further example, the profiles of agent 104 and prospective customer 101 may be updated to reflect the success or lack of success in completing the transaction involving a product or service.

As a result of the foregoing, embodiments of the present disclosure provide a means for improving the technology or technical field of auto dialer systems by analyzing a voice response from the prospective customer to a telephone call made by the auto dialer to determine the appropriate agent to service the prospective customer.

Furthermore, the present disclosure improves the technology or technical field involving auto dialer systems. As discussed above, an auto dialer is an electronic device or software that automatically dials telephone numbers. Once the call has been answered, the auto dialer either plays a recorded message or connects the call to a live person. An important technology for auto dialers is the ability to distinguish between live human pick-ups from answering machines. Since there is no indication hardware signal when a call is answered by an answering machine or voice-mail system, auto dialer systems have to analyze incoming audio for a prediction. After making such a prediction, if the prediction is that there has been a live human pick-up, the auto dialer connects the answered call to a live agent. The live agent though may not be the best suited agent to service the prospective customer. Unfortunately, auto dialers do not include technology to connect the call to the live agent that would be best to service the prospective customer.

Embodiments of the present disclosure improve such technology by detecting a voice response from a communication device of a prospective customer to a telephone call made by the auto dialer. The prospective customer's voice response is then analyzed to determine characteristics of the prospective customer, such as age, gender, language, mood, emotions, etc. A profile of the prospective customer is then created containing such determined characteristics. Furthermore, the profiles of agents that are available to assist the prospective customer are analyzed. Such profiles of agents include characteristics, such as friendliness, patience, empathy, listening capacity, language, communication skills, age, etc. Additionally, the profile of the prospective customer is analyzed. After analyzing the profiles of the agents available to assist the prospective customer as well as the profile of the prospective customer, a free agent is identified that would best service the prospective customer based on such an analysis. For example, the free agent with the most appropriate skills to service this particular prospective customer (with the characteristics previously identified) in a manner that provides the service in a most satisfactory manner from the perspective of the prospective customer and provides the business with the highest chance in completing a transaction involving a service or product is identified. The telephone call is then connected to the communication device of the identified free agent to service the prospective customer. In this manner, auto dialer systems are enhanced by determining the appropriate agent to service the prospective customer. Furthermore, in this manner, there is an improvement in the technical field involving auto dialer systems.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for enhancing auto dialer systems, the method comprising:
   detecting a voice response from a communication device of a prospective customer to a telephone call;
   analyzing said voice response to determine characteristics of said prospective customer, wherein said analysis of said voice response comprises translating said voice response into text and then analyzing said text to identify moods and emotions, wherein said moods and emotions are identified using a local affinity method, a learning-based method, an ontology or a keyword spotting technique;
   creating a profile of said prospective customer to include said determined characteristics;
   analyzing profiles of agents that are available to assist said prospective customer, wherein said profiles of agents comprise characteristics of said agents that are available to assist said prospective customer;
   analyzing said profile of said prospective customer;
   identifying a free agent from said agents that are available to assist said prospective customer based on said analysis of said characteristics of said agents that are available to assist said prospective customer and said analysis of said characteristics of said prospective customer, wherein a table stores a listing of prospective customer characteristics matched with a list of agent characteristics, wherein a table look-up operation of said table is performed to identify said free agent out of a plurality of available agents based on having a greatest number of characteristics that match said characteristics of said prospective customer; and
   connecting said telephone call to a communication device of said identified free agent to service said prospective customer.

2. The method as recited in claim 1, wherein said characteristics of said prospective customer comprise the following: age, gender, language, mood and emotion.

3. The method as recited in claim 1, wherein said characteristics of said agents that are available to assist said prospective customer comprise one or more of the following: friendliness, patience, empathy, listening capacity, language, communication skills, and age.

4. The method as recited in claim 1 further comprising:
   automatically dialing telephone numbers to said prospective customers.

5. The method as recited in claim 1 further comprising:
   monitoring a conversation with said identified free agent and said prospective customer;
   analyzing said conversation to determine a mood and an emotion of said prospective customer and to determine a tone and an emotion of said identified free agent;
   receiving a rating of said identified free agent from said prospective customer; and
   updating said profile of said identified free agent and said profile of said prospective customer based on said analysis of said conversation and said received rating of said identified free agent.

6. The method as recited in claim 1 further comprising:
   creating profiles of agents that comprise an assessment of skills and a personality assessment;
   storing said created profiles of agents in a database.

7. The method as recited in claim 1 further comprising:
   storing said created profile of said prospective customer in a database.

8. A computer program product for enhancing auto dialer systems, the computer program product comprising one or more computer readable storage mediums having program code embodied therewith, the program code comprising programming instructions for:
   detecting a voice response from a communication device of a prospective customer to a telephone call;
   analyzing said voice response to determine characteristics of said prospective customer, wherein said analysis of said voice response comprises translating said voice response into text and then analyzing said text to identify moods and emotions, wherein said moods and emotions are identified using a local affinity method, a learning-based method, an ontology or a keyword spotting technique;
   creating a profile of said prospective customer to include said determined characteristics;
   analyzing profiles of agents that are available to assist said prospective customer, wherein said profiles of agents comprise characteristics of said agents that are available to assist said prospective customer;
   analyzing said profile of said prospective customer;
   identifying a free agent from said agents that are available to assist said prospective customer based on said analysis of said characteristics of said agents that are available to assist said prospective customer and said analysis of said characteristics of said prospective customer, wherein a table stores a listing of prospective customer characteristics matched with a list of agent characteristics, wherein a table look-up operation of said table is performed to identify said free agent out of a plurality of available agents based on having a greatest number of characteristics that match said characteristics of said prospective customer; and
   connecting said telephone call to a communication device of said identified free agent to service said prospective customer.

9. The computer program product as recited in claim 8, wherein said characteristics of said prospective customer comprise the following: age, gender, language, mood and emotion.

10. The computer program product as recited in claim 8, wherein said characteristics of said agents that are available to assist said prospective customer comprise one or more of the following: friendliness, patience, empathy, listening capacity, language, communication skills, and age.

11. The computer program product as recited in claim 8, wherein the program code further comprises the programming instructions for:
    automatically dialing telephone numbers to prospective customers.

12. The computer program product as recited in claim 8, wherein the program code further comprises the programming instructions for:
    monitoring a conversation with said identified free agent and said prospective customer;
    analyzing said conversation to determine a mood and an emotion of said prospective customer and to determine a tone and an emotion of said identified free agent;
    receiving a rating of said identified free agent from said prospective customer; and updating said profile of said identified free agent and said profile of said prospective customer based on said analysis of said conversation and said received rating of said identified free agent.

13. The computer program product as recited in claim 8, wherein the program code further comprises the programming instructions for:
creating profiles of agents that comprise an assessment of skills and a personality assessment;
storing said created profiles of agents in a database.

14. The computer program product as recited in claim 8, wherein the program code further comprises the programming instructions for:
storing said created profile of said prospective customer in a database.

15. A system, comprising:
a memory for storing a computer program for enhancing auto dialer systems; and
a processor connected to said memory, wherein said processor is configured to execute program instructions of the computer program comprising:
detecting a voice response from a communication device of a prospective customer to a telephone call;
analyzing said voice response to determine characteristics of said prospective customer, wherein said analysis of said voice response comprises translating said voice response into text and then analyzing said text to identify moods and emotions, wherein said moods and emotions are identified using a local affinity method, a learning-based method, an ontology or a keyword spotting technique;
creating a profile of said prospective customer to include said determined characteristics;
analyzing profiles of agents that are available to assist said prospective customer, wherein said profiles of agents comprise characteristics of said agents that are available to assist said prospective customer;
analyzing said profile of said prospective customer;
identifying a free agent from said agents that are available to assist said prospective customer based on said analysis of said characteristics of said agents that are available to assist said prospective customer and said analysis of said characteristics of said prospective customer, wherein a table stores a listing of prospective customer characteristics matched with a list of agent characteristics, wherein a table look-up operation of said table is performed to identify said free agent out of a plurality of available agents based on having a greatest number of characteristics that match said characteristics of said prospective customer; and
connecting said telephone call to a communication device of said identified free agent to service said prospective customer.

16. The system as recited in claim 15, wherein said characteristics of said prospective customer comprise the following: age, gender, language, mood and emotion.

17. The system as recited in claim 15, wherein said characteristics of said agents that are available to assist said prospective customer comprise one or more of the following: friendliness, patience, empathy, listening capacity, language, communication skills, and age.

18. The system as recited in claim 15, wherein the program instructions of the computer program further comprise:
automatically dialing telephone numbers to prospective customers.

19. The system as recited in claim 15, wherein the program instructions of the computer program further comprise:
monitoring a conversation with said identified free agent and said prospective customer;
analyzing said conversation to determine a mood and an emotion of said prospective customer and to determine a tone and an emotion of said identified free agent;
receiving a rating of said identified free agent from said prospective customer; and
updating said profile of said identified free agent and said profile of said prospective customer based on said analysis of said conversation and said received rating of said identified free agent.

20. The system as recited in claim 15, wherein the program instructions of the computer program further comprise:
creating profiles of agents that comprise an assessment of skills and a personality assessment;
storing said created profiles of agents in a database.

\* \* \* \* \*